United States Patent
Uchino et al.

(10) Patent No.: US 11,661,107 B2
(45) Date of Patent: May 30, 2023

(54) STEERING CONTROL DEVICE

(71) Applicant: JTEKT CORPORATION, Osaka (JP)

(72) Inventors: Yoshiyuki Uchino, Okazaki (JP); Yusuke Kakimoto, Okazaki (JP); Koji Anraku, Okazaki (JP); Isao Namikawa, Okazaki (JP); Kenji Shibata, Nagoya (JP); Takafumi Sato, Kariya (JP)

(73) Assignee: JTEKT CORPORATION, Osaka (JP)

( * ) Notice: Subject to any disclaimer, the term of this patent is extended or adjusted under 35 U.S.C. 154(b) by 266 days.

(21) Appl. No.: 17/218,957

(22) Filed: Mar. 31, 2021

(65) Prior Publication Data

US 2021/0309290 A1 Oct. 7, 2021

(30) Foreign Application Priority Data

Apr. 3, 2020 (JP) .............................. JP2020-067711

(51) Int. Cl.
*B62D 6/00* (2006.01)
*B62D 5/00* (2006.01)

(52) U.S. Cl.
CPC .............. *B62D 6/008* (2013.01); *B62D 5/005* (2013.01)

(58) Field of Classification Search
CPC ................................ B62D 6/008; B62D 5/005
See application file for complete search history.

(56) References Cited

U.S. PATENT DOCUMENTS

| 2004/0236487 | A1* | 11/2004 | Yao | B62D 6/002 |
| | | | | 180/443 |
| 2012/0303218 | A1* | 11/2012 | Tamura | B62D 1/046 |
| | | | | 701/41 |
| 2018/0141584 | A1* | 5/2018 | El Aile | B62D 15/0245 |

FOREIGN PATENT DOCUMENTS

| EP | 1 308 367 A2 | 5/2003 | |
| GB | 2391003 A * | 1/2004 | ............. B62D 5/006 |
| JP | 2006-321434 A | 11/2006 | |

(Continued)

OTHER PUBLICATIONS

Aug. 31, 2021 extended Search Report issued in European Patent Application No. 21166592.2.

*Primary Examiner* — Khoi H Tran
*Assistant Examiner* — Tristan J Greiner
(74) *Attorney, Agent, or Firm* — Oliff PLC (57) ABSTRACT

A steering control device includes control circuitry configured to perform synchronization control. The synchronization control includes a target synchronization angle calculating process of calculating a target synchronization angle that is a steering-side rotation angle satisfying a predetermined correspondence relationship with respect to a turning-side rotation angle; a target relay angle calculating process of calculating a target relay angle that is located closer to a first side in a circumferential direction than a first-side angle is, the first-side angle being one of the steering-side rotation angle and the target synchronization angle and being located closer to the first side than another of the steering-side rotation angle and the target synchronization angle is; and a motor driving process of operating a steering-side motor such that the steering-side rotation angle reaches the target synchronization angle after operating the steering-side motor such that the steering-side rotation angle reaches the target relay angle.

3 Claims, 6 Drawing Sheets

(56) References Cited

FOREIGN PATENT DOCUMENTS

| JP | 2012-091677 A | 5/2012 |
|---|---|---|
| WO | 2019/052651 A1 | 3/2019 |

\* cited by examiner

STEERING CONTROL DEVICE

CROSS-REFERENCE TO RELATED APPLICATION

This application claims priority to Japanese Patent Application No. 2020-067711 filed on Apr. 3, 2020, incorporated herein by reference in its entirety.

BACKGROUND

1. Technical Field

The disclosure relates to a steering control device.

2. Description of Related Art

In the related art, for example, as described in Japanese Patent Application Publication No. 2012-91677 (JP 2012-91677 A), a steer-by-wire steering system in which a power transmission path between a steering unit that is connected to a steering wheel and a turning unit that turns turning wheels is cut off is known. A steering control device that controls such a steering system controls the steering system such that a positional relationship between a steering angle of the steering wheel and a turning angle of the turning wheels is a predetermined correspondence relationship when an ignition switch is in an on state. Specifically, the steering control device turns the turning wheels such that the turning angle corresponding to the steering angle is achieved by operating a turning-side motor which is provided in the turning unit. On the other hand, when the steering wheel is steered when the ignition switch is in an off state, the steering control device does not turn the turning wheels. As a result, the positional relationship between the steering angle and the turning angle departs from the predetermined correspondence relationship.

Therefore, for example, Japanese Patent Application Publication No. 2006-321434 (JP 2006-321434 A) discloses a steering system in which a steering wheel is rotated such that a steering angle reaches an angle corresponding to a turning angle, for example, immediately after an ignition switch has been turned on in a case where the steering wheel has been steered while the ignition switch has been in the off state. By performing such a synchronization operation, the positional relationship between the steering angle and the turning angle is prevented from departing from a predetermined correspondence relationship after the ignition switch has been turned on.

SUMMARY

In the configuration described in JP 2006-321434 A, the synchronization operation is performed such that the steering angle directly becomes close to an angle corresponding to the turning angle. Accordingly, in the configuration, the rotation direction of the steering wheel in the synchronization operation varies depending on a direction of departure of the steering angle from the turning angle. That is, an operation manner in the synchronization operation varies.

Here, it is assumed that a steering wheel is often steered to the right, for example, due to a driver's habit at the time of boarding a vehicle while an ignition switch is in the off state. In this case, when it is assumed that the driver has accidentally steered the steering wheel to the left while the ignition switch is in the off state, the rotation direction of the steering wheel in the synchronization operation is opposite to a rotation direction in which the steering wheel is usually rotated in the synchronization operation. As a result, when the synchronization operation is actually performed, for example, the driver may feel uneasy (i.e., insecurity) about whether the steering angle has reached an angle corresponding to the turning angle.

The disclosure provides a steering control device that can prevent a driver from feeling uneasy when a synchronization operation is performed.

A steering control device according to an aspect of the disclosure is configured to control a steering system with a structure in which a power transmission path between a steering unit that is connected to a steering wheel and a turning unit that turns turning wheels is cut off. The steering control device includes control circuitry configured to perform synchronization control for adjusting a steering-side rotation angle that is a rotation angle convertible to a steering angle of the steering wheel, by operating a steering-side motor such that a positional relationship between the steering-side rotation angle and a turning-side rotation angle that is a rotation angle convertible to a turning angle of the turning wheels is a predetermined correspondence relationship. The steering unit includes the steering-side motor configured to rotate the steering wheel. The synchronization control includes a target synchronization angle calculating process of calculating a target synchronization angle that is the steering-side rotation angle satisfying the predetermined correspondence relationship with respect to the turning-side rotation angle; a target relay angle calculating process of calculating a target relay angle that is located closer to a first side in a circumferential direction than a first-side angle is, the first-side angle being one of the steering-side rotation angle and the target synchronization angle and being located closer to the first side than another of the steering-side rotation angle and the target synchronization angle is; and a motor driving process of operating the steering-side motor such that the steering-side rotation angle reaches the target synchronization angle after operating the steering-side motor such that the steering-side rotation angle reaches the target relay angle.

With this configuration, when the synchronization control is performed, the steering wheel is rotated such that the steering-side rotation angle reaches the target synchronization angle after having reached the target relay angle, and thus the rotation direction of the steering wheel is changed while the synchronization operation is being performed. That is, the synchronization operation is a two-step operation. Regardless of the relative positional relationship between the steering-side rotation angle and the target synchronization, the target relay angle is set to be closer to the first side in the circumferential direction than the first-side angle is, the first-side angle being one of the steering-side rotation angle and the target synchronization and being located closer to the first side than the other of the steering-side rotation angle and the target synchronization angle is. Accordingly, regardless of the relative positional relationship between the steering-side rotation angle and the target synchronization angle, the synchronization operation is performed such that the steering wheel is rotated to the first side in the circumferential direction and then is rotated to a second side opposite to the first side in the circumferential direction. Accordingly, since the synchronization operation is performed in the same operation manner regardless of the relative positional relationship between the steering-side rotation angle and the target synchronization angle, it is possible to prevent a driver from feeling uneasy.

In the steering control device according to the aspect, a lower limit of a rotation amount may be set based on visibility of rotation of the steering wheel, and the lower limit may be set as a minimum rotation amount; and when an absolute value of an angle difference between the steering-side rotation angle and the target synchronization angle is larger than a predetermined angle difference, the target relay angle calculating process may calculate, as the target relay angle, an angle that is located closer to the first side by the minimum rotation amount than the first-side angle is.

With this configuration, the target relay angle is prevented from being excessively separated from a second-side angle that is the other of the steering-side rotation angle and the target synchronization angle and is located closer to the second side in the circumferential direction than the first-side angle is. Accordingly, it is possible to curb an increase in time required for the synchronization operation.

In the steering control device according to the aspect, a lower limit of a rotation amount may be set based on visibility of rotation of the steering wheel, and the lower limit may be set as a minimum rotation amount; a rotation amount greater than the minimum rotation amount may be set as an intermediate rotation amount; and when an absolute value of an angle difference between the steering-side rotation angle and the target synchronization angle is equal to or less than a predetermined angle difference, the target relay angle calculating process may calculate, as the target relay angle, an angle that is located closer to the first side by the intermediate rotation amount than the first-side angle is.

With this configuration, the target relay angle is prevented from being excessively close to the first-side angle that is the one of the steering-side rotation angle and the target synchronization angle and is located closer to the first side in the circumferential direction than the other (i.e., the second-side angle) of the steering-side rotation angle and the target synchronization angle is. Accordingly, it is possible to enable a driver to recognize that the synchronization operation is a two-step operation.

In the steering control device according to the aspect, the intermediate rotation amount may be a rotation amount that is equal to or less than a sum value of the minimum rotation amount and the predetermined angle difference. With this configuration, the target relay angle is prevented from being excessively separated from the first-side angle that is the one of the steering-side rotation angle and the target synchronization angle and is located closer to the first side in the circumferential direction than the other (i.e., the second-side angle) of the steering-side rotation angle and the target synchronization angle is. Accordingly, it is possible to curb an increase in time required for the synchronization operation.

According to the aspect of the disclosure, it is possible to prevent a driver from feeling uneasy about a synchronization operation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
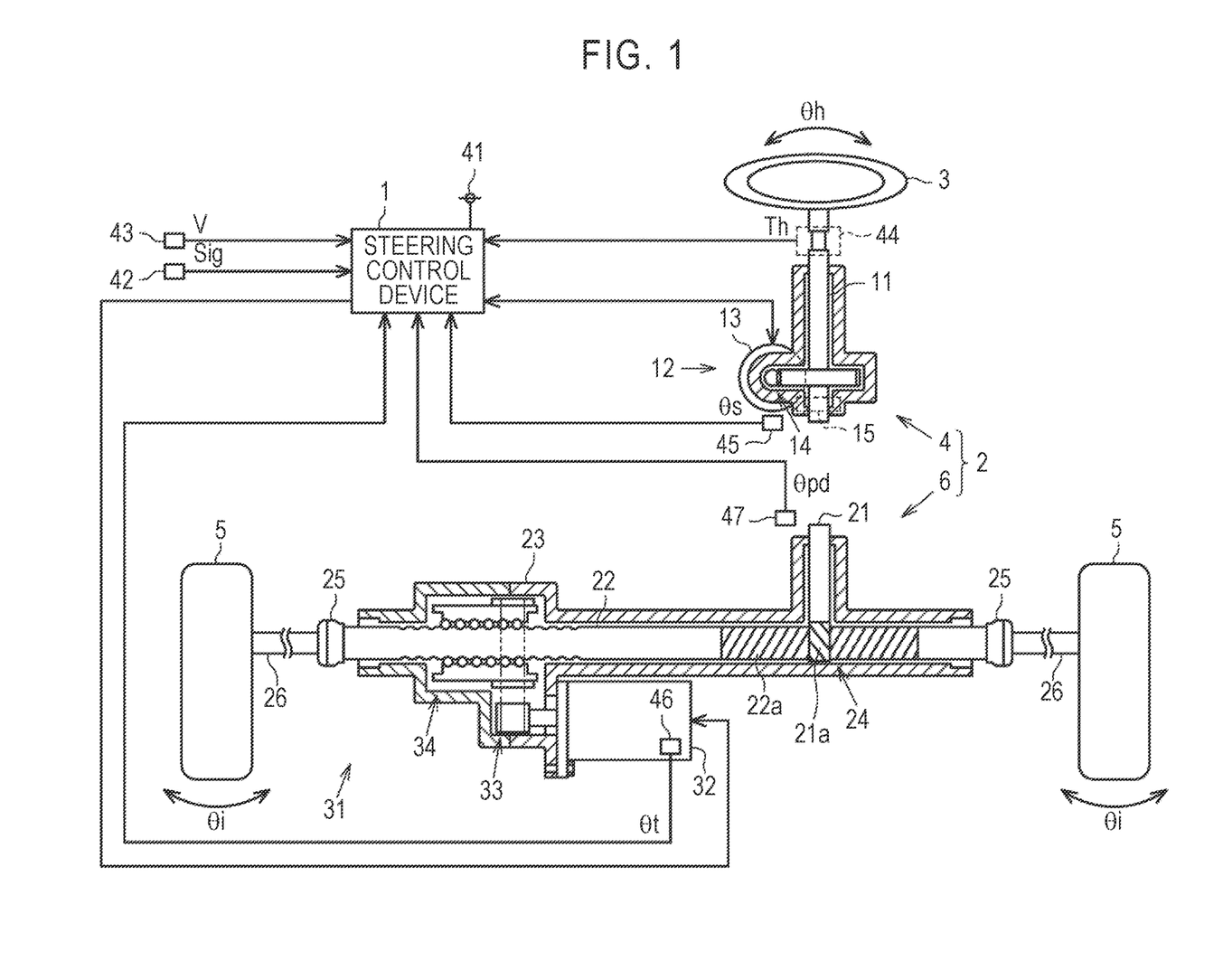
FIG. 1 is a diagram schematically illustrating a configuration of a steering system.

Hereinafter, a steering control device according to an embodiment of the disclosure will be described with reference to the accompanying drawings. As illustrated in FIG. 1, a steering system 2 which is controlled by a steering control device 1 is configured as a steer-by-wire steering system. The steering system 2 includes a steering unit 4 that is steered by a driver via a steering wheel 3 and a turning unit 6 that turns turning wheels 5 in accordance with steering of the steering unit 4 by the driver. The shape of the steering wheel 3 in this embodiment is rotationally asymmetric about a rotation center thereof.

The steering unit 4 includes a steering shaft 11 that is connected to the steering wheel 3 and a steering-side actuator 12 that applies a steering reaction force which is a force against steering to the steering wheel 3 via the steering shaft 11.

The steering-side actuator 12 includes a steering-side motor 13 which is a drive source and a speed reducer 14. For example, a worm-and-wheel mechanism is employed as the speed reducer 14. The steering-side motor 13 is connected to the steering shaft 11 via the speed reducer 14. The steering-side actuator 12 includes a restriction mechanism 15 that mechanically restricts a steering angle θh of the steering wheel 3 from exceeding a threshold angle. The threshold angle is set in advance based on, for example, a transmission ratio (θh/θi) between the steering angle θh and a turning angle θi of the turning wheels 5. For example, an appropriate structure such as a structure described in JP 2012-91677 A can be employed as the restriction mechanism 15.

The turning unit 6 includes a pinion shaft 21, a rack shaft 22 that is connected to the pinion shaft 21, a rack housing 23 that accommodates the rack shaft 22 such that the rack shaft 22 can reciprocate, and a rack and pinion mechanism 24 that includes the pinion shaft 21 and the rack shaft 22. The rack shaft 22 and the pinion shaft 21 are arranged at a predetermined crossing angle in the rack housing 23. The rack and pinion mechanism 24 has a configuration in which pinion teeth 21a formed in the pinion shaft 21 and rack teeth 22a formed in the rack shaft 22 engage with each other. Accordingly, the pinion shaft 21 rotates along with reciprocation of the rack shaft 22. Tie rods 26 are respectively connected to both ends of the rack shaft 22 via ball joints 25. The tips of the tie rods 26 are connected to knuckles (not illustrated) to which the turning wheels 5 are assembled.

The turning unit 6 includes a turning-side actuator 31 that applies a turning force for turning the turning wheels 5 to the rack shaft 22. The turning-side actuator 31 includes a turning-side motor 32 that serves as a drive source, a belt mechanism 33, and a ball screw mechanism 34. The turning-side actuator 31 applies a turning force to the turning unit 6 by transmitting rotation of the turning-side motor 32 to the ball screw mechanism 34 via the belt mechanism 33 and causing the ball screw mechanism 34 to convert the rotation to reciprocation of the rack shaft 22.

In the steering system 2 having the aforementioned configuration, the rack shaft 22 is caused to reciprocate and a turning angle θi of the turning wheels 5 is changed by applying the turning force from the turning-side actuator 31 according to a driver's steering operation. At this time, a steering reaction force against the driver's steering is applied to the steering wheel 3 from the steering-side actuator 12.

An electrical configuration according to this embodiment will be described below. The steering control device 1 operates the steering-side motor 13 and the turning-side motor 32. The steering control device 1 includes a central processing unit (CPU) and a memory which are not illustrated. In other words, the steering control device 1 includes control circuitry. Various types of control are performed by the steering control device 1 by causing the CPU to execute a program stored in the memory in each of predetermined operation cycles. The steering control device 1 operates with electric power which is supplied from a battery 41 mounted in the vehicle.

A start signal Sig indicating an on state or an off state of a start switch 42 of the vehicle such as an ignition switch is input to the steering control device 1. Results of detection from various sensors are input to the steering control device 1. Various sensors include, for example, a vehicle speed sensor 43, a torque sensor 44, a steering-side rotation angle sensor 45, a turning-side rotation angle sensor 46, and a pinion angle sensor 47.

The vehicle speed sensor 43 detects a vehicle speed V which is a traveling speed of the vehicle. The torque sensor 44 detects a steering torque Th which is applied to the steering shaft 11. The steering-side rotation angle sensor 45 detects a rotation angle θs of a rotation shaft of the steering-side motor 13 as a relative angle in a range of 360°. The turning-side rotation angle sensor 46 detects a rotation angle θt of a rotation shaft of the turning-side motor 32 as a relative angle. The pinion angle sensor 47 detects a pinion angle θpd which is a rotation angle of the pinion shaft 21 as an absolute angle in a range including a range exceeding 360°.

As described above, the pinion shaft 21 rotates along with reciprocation of the rack shaft 22, that is, along with turning of the turning wheels 5. Accordingly, the pinion angle θpd is a rotation angle which is convertible to the turning angle θi of the turning wheels 5 and corresponds to a turning-side rotation angle. The pinion angle θpd is detected, for example, as being a positive value when it is an angle on the right side of a pinion angle midpoint θp0 which is an angle when the vehicle travels straight ahead and as being a negative value when it is an angle on the left side.

The steering control device 1 calculates a steering angle θh which is a rotation angle of the steering shaft 11 based on the rotation angle θs of the steering-side motor 13. The steering angle θh corresponds to a steering-side rotation angle. Specifically, the steering control device 1 counts, for example, the number of turns of the steering-side motor 13 from a steering midpoint θh0, and calculates a sum angle which is an angle obtained by summing values of the rotation angle θs with the steering midpoint θh0 serving as an origin. The steering midpoint θh0 is a steering angle θh when the steering wheel 3 is located at the center of a steerable range. The steering control device 1 calculates the steering angle θh of the steering wheel 3 by multiplying the sum angle by a conversion factor based on a rotation speed ratio of the speed reducer 14. The steering angle θh is detected, for example, as being a positive value when it is an angle on the right side of the steering midpoint θh0 and as being a negative value when it is an angle on the left side of the steering midpoint θh0.

When the battery 41 is connected in a state in which the start switch 42 is in the off state, the steering control device 1 according to this embodiment holds a value of the steering angle θh at a time point at which the start switch 42 has been turned off, and monitors rotation of the steering-side motor 13. When the steering-side motor 13 is rotating in a state in which the start switch 42 is in the off state, the steering control device 1 calculates the steering angle θh changed by a value corresponding to the rotation when the start switch 42 is turned on next time.

The steering control device 1 calculates a target reaction torque which is a target value of the steering reaction force, based on the steering torque Th and the vehicle speed V. Then, the steering control device 1 operates the steering-side motor 13 such that a motor torque corresponding to the target reaction torque is generated. Accordingly, the steering reaction force is applied to the steering unit 4.

The steering control device 1 counts, for example, the number of turns of the turning-side motor 32 from the pinion angle midpoint θp0, and calculates a sum angle which is an angle obtained by summing values of the rotation angle θt with the pinion angle midpoint θp0 serving as an origin. The steering control device 1 calculates a turning-corresponding angle θpc which is convertible to the turning angle θi of the turning wheels 5 by multiplying the sum angle by a conversion factor based on a speed reduction ratio of the belt mechanism 33, a lead of the ball screw mechanism 34, and a rotation speed ratio of the rack and pinion mechanism 24.

That is, the turning-corresponding angle $\theta pc$ represents the rotation angle of the pinion shaft 21 and is basically the same angle as the pinion angle $\theta pd$. The turning-corresponding angle $\theta pc$ corresponds to a turning-side rotation angle. The turning-corresponding angle $\theta pc$ is, for example, a positive value when it is an angle on the right side of the pinion angle midpoint $\theta p0$ and a negative value when it is an angle on the left side of the pinion angle midpoint $\theta p0$.

The steering control device 1 calculates a target turning-corresponding angle $\theta p^*$ which is a target value of the turning-corresponding angle $\theta pc$ based on the steering angle $\theta h$. For example, the steering control device 1 calculates, as the target turning-corresponding angle $\theta p^*$, a value obtained by dividing the steering angle $\theta h$ by a transmission ratio which varies depending on the steering angle $\theta h$ and the vehicle speed V. The steering control device 1 calculates a target turning torque which is a target value of the turning force by performing feedback control such that the turning-corresponding angle $\theta pc$ conforms to the target turning-corresponding angle $\theta p^*$. Then, the steering control device 1 operates the turning-side motor 32 such that a motor torque corresponding to the target turning torque is generated. Accordingly, the turning force is applied to the turning unit 6. That is, the steering control device 1 controls the steering system 2 such that a positional relationship between the steering angle $\theta h$ and the turning angle $\theta i$ of the turning wheels 5 is a predetermined correspondence relationship which is determined according to the transmission ratio.

When the steering wheel 3 is steered in a state in which the start switch 42 is turned off, the steering control device 1 does not turn the turning wheels 5 by operating the turning-side motor 32. As a result, the positional relationship between the steering angle $\theta h$ and the turning angle $\theta i$ of the turning wheels 5 departs from the predetermined correspondence relationship.

Therefore, when the positional relationship between the steering angle $\theta h$ and the pinion angle $\theta pd$ is not the predetermined correspondence relationship, the steering control device 1 performs synchronization control for adjusting the steering angle $\theta h$ such that the positional relationship between the steering angle $\theta h$ and the pinion angle $\theta pd$ is the predetermined correspondence relationship by operating the steering-side motor 13. Synchronization control is performed as a two-step operation in which the steering wheel 3 rotates to a first side in a circumferential direction and then rotates to a second side in the circumferential direction. In this embodiment, the right side is the first side in the circumferential direction and the left side is the second side in the circumferential direction.

Specifically, the steering control device 1 performs synchronization control immediately after the start switch 42 has been turned on. When synchronization control is performed, the steering control device 1 first performs a target synchronization angle calculating process of calculating a target synchronization angle $\theta sy^*$ which is the steering angle $\theta h$ satisfying a predetermined correspondence relationship with respect to the pinion angle $\theta pd$. Subsequently, the steering control device 1 performs a target relay angle calculating process of calculating a target relay angle $\theta rl^*$ which is a target angle of the steering wheel 3 in a first step at the time of a synchronization operation. Then, the steering control device 1 performs a motor driving process of operating the steering-side motor 13 such that the steering angle $\theta h$ reaches the target relay angle $\theta rl^*$ and then operating the steering-side motor 13 such that the steering angle $\theta h$ reaches the target synchronization angle $\theta sy^*$.

In the target synchronization angle calculating process, the steering control device 1 calculates the target synchronization angle $\theta sy^*$ based on the pinion angle $\theta pd$. Specifically, the steering control device 1 calculates the target synchronization angle $\theta sy^*$ by multiplying the pinion angle $\theta pd$ detected immediately after the start switch 42 has been turned on by the transmission ratio at a time when the vehicle speed V is zero.

In the target relay angle calculating process, the steering control device 1 calculates, as the target relay angle $\theta rl^*$, an angle which is located closer to the right side than one (hereinafter referred to as a first-side angle $\theta x$) of an actual steering angle $\theta h$ based on the rotation angle $\theta s$ of the steering-side motor 13 and the target synchronization angle $\theta sy^*$ is. The first-side angle $\theta x$ that is the one of the actual steering angle $\theta h$ and the target synchronization angle $\theta sy^*$ is located closer to the right side (i.e., first side) than the other of the actual steering angle $\theta h$ and the target synchronization angle $\theta sy^*$ is. The steering control device 1 according to this embodiment changes a method of calculating the target relay angle $\theta rl^*$ depending on the absolute value of an angle difference $\Delta\theta$ between the steering angle $\theta h$ and the target synchronization angle $\theta sy^*$.

Specifically, when the absolute value of the angle difference $\Delta\theta$ is greater than a predetermined angle difference $\Delta\theta th$, the steering control device 1 calculates, as the target relay angle $\theta rl^*$, an angle which is located closer to the right side by a minimum rotation amount $\Delta\theta min$ than the first-side angle $\theta x$ is. On the other hand, when the absolute value of the angle difference $\Delta\theta$ is equal to or less than the predetermined angle difference $\Delta\theta th$, the steering control device 1 calculates, as the target relay angle $\theta rl^*$, an angle which is located closer to the right side by an intermediate rotation amount $\Delta\theta$ mod than the first-side angle $\theta x$ is.

The predetermined angle difference $\Delta\theta th$ is a rotation amount indicating that the steering angle $\theta h$ and the target synchronization angle $\theta sy^*$ are separated from each other to a certain extent, and is set to such a rotation amount that the rotation is easily visible to a driver when the steering wheel 3 rotates by the predetermined angle difference $\Delta\theta th$. The minimum rotation amount $\Delta\theta min$ is set to such a rotation amount that the rotation is visible to a driver when the steering wheel 3 rotates by the minimum rotation amount $\Delta\theta min$. The intermediate rotation amount $\Delta\theta$ mod is set to a rotation amount which is greater than the minimum rotation amount $\Delta\theta min$ and equal to or less than a sum value obtained by adding the predetermined angle difference $\Delta\theta th$ to the minimum rotation amount $\Delta\theta min$.

In the motor driving process, the steering control device 1 first sets the target relay angle $\theta rl^*$ as a first target steering angle and performs angle feedback control for adjusting the steering angle $\theta h$ to the first target steering angle. When the steering angle $\theta h$ reaches the target relay angle $\theta rl^*$, the steering control device 1 sets the target synchronization angle $\theta sy^*$ as a second target steering angle and performs angle feedback control for adjusting the steering angle $\theta h$ to the second target steering angle. Then, when the steering angle $\theta h$ reaches the target synchronization angle $\theta sy^*$, the steering-side motor 13 is stopped.

Figure 2:
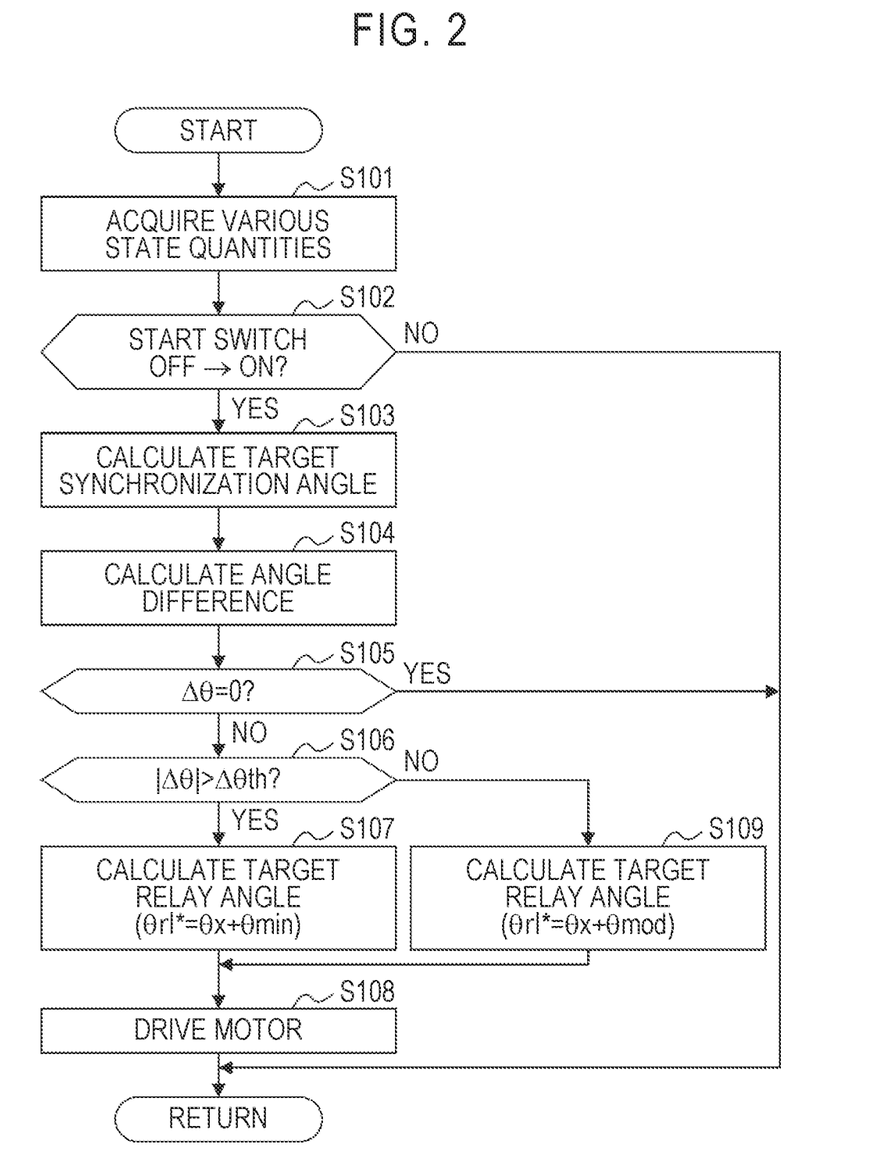
FIG. 2 is a flowchart illustrating a process routine of synchronization control which is performed by a steering control device.

A process routine of synchronization control which is performed by the steering control device 1 will be described below. As illustrated in the flowchart of FIG. 2, when various state quantities are acquired (Step 101), the steering control device 1 determines whether the start switch 42 has been switched from an off state to an on state based on the start signal Sig (Step 102). That is, in Step 102, it is determined whether the start switch 42 has just been turned on. When the start switch 42 has not been turned on just before (Step 102: NO), the steering control device 1 does not perform a subsequent process.

When the start switch 42 has just been turned on (Step 102: YES), the steering control device 1 calculates the target synchronization angle θsy* (Step 103) and calculates the angle difference Δθ (Step 104). Subsequently, the steering control device 1 determines whether the angle difference Δθ is zero (Step 105), and does not perform a subsequent process when the angle difference Δθ is zero (Step 105: YES).

On the other hand, when the angle difference Δθ is not zero (Step 105: NO), the steering control device 1 determines whether the absolute value of the angle difference Δθ is greater than the predetermined angle difference Δθth (Step 106). When the absolute value of the angle difference Δθ is greater than the predetermined angle difference Δθth (Step 106: YES), the steering control device 1 calculates the target relay angle θrl* by adding the minimum rotation amount Δθmin to the first-side angle θx (Step 107). Then, the steering control device 1 drives the steering-side motor 13 based on the target synchronization angle θsy* calculated in Step 103 and the target relay angle θrl* calculated in Step 107 (Step 108).

On the other hand, when the absolute value of the angle difference Δθ is equal to or less than the predetermined angle difference Δθth (Step 106: NO), the steering control device 1 calculates the target relay angle θrl* by adding the intermediate rotation amount Δθ mod to the first-side angle θx (Step 109). Then, the steering control device 1 drives the steering-side motor 13 based on the target synchronization angle θsy* calculated in Step 103 and the target relay angle θrl* calculated in Step 109 (Step 108).

Figure 3A:
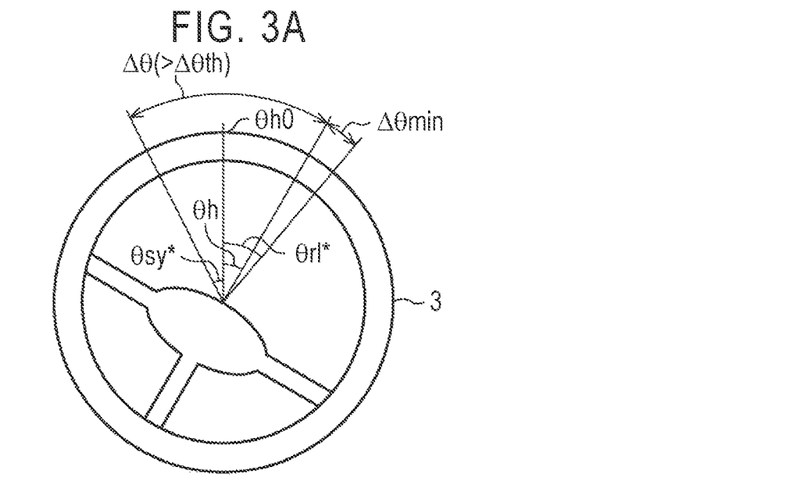
FIG. 3A is a schematic diagram illustrating an example of a synchronization operation when an angle difference between a steering angle and a target synchronization angle is large.

Operations of this embodiment will be described below. First, it is assumed that the steering angle θh is located closer to the right side than the target synchronization angle θsy* is. As illustrated in FIG. 3A, when the angle difference Δθ is greater than the predetermined angle difference Δθth, the target relay angle θrl* is located closer to the right side by the minimum rotation amount Δθmin than the steering angle θh is.

Figure 3B:
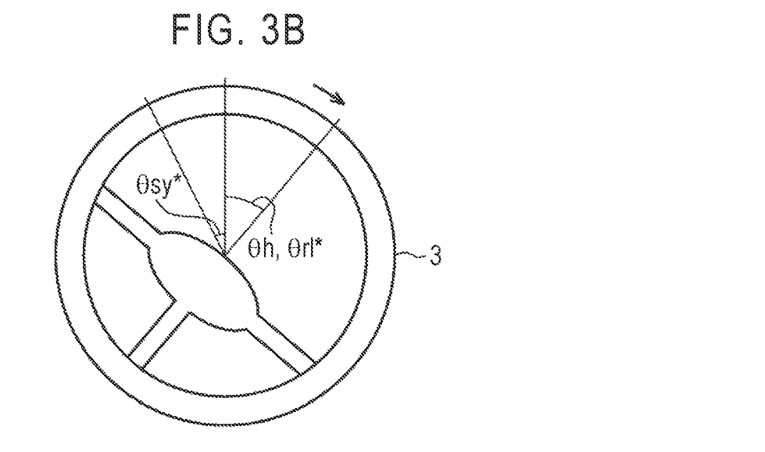
FIG. 3B is a schematic diagram illustrating the example of the synchronization operation when the angle difference between the steering angle and the target synchronization angle is large.

When the motor driving process is started, the steering wheel 3 rotates to the right until the steering angle θh reaches the target relay angle θrl* as indicated by a bold solid arrow in FIG. 3B. Subsequently, when the steering angle θh reaches the target relay angle θrl*, the steering wheel 3 rotates to the left until the steering angle θh reaches the target synchronization angle θsy* as indicated by a bold solid arrow in FIG. 3C. That is, the steering wheel 3 rotates to the right once and then rotates to the left.

Figure 3C:
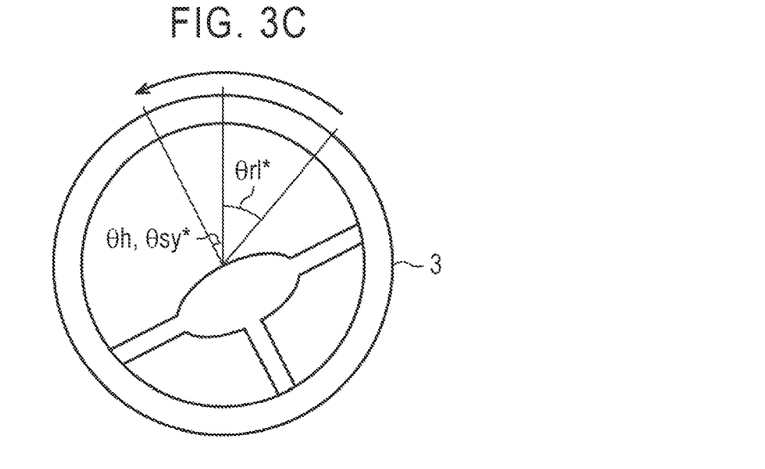
FIG. 3C is a schematic diagram illustrating the example of the synchronization operation when the angle difference between the steering angle and the target synchronization angle is large.
Figure 4A:
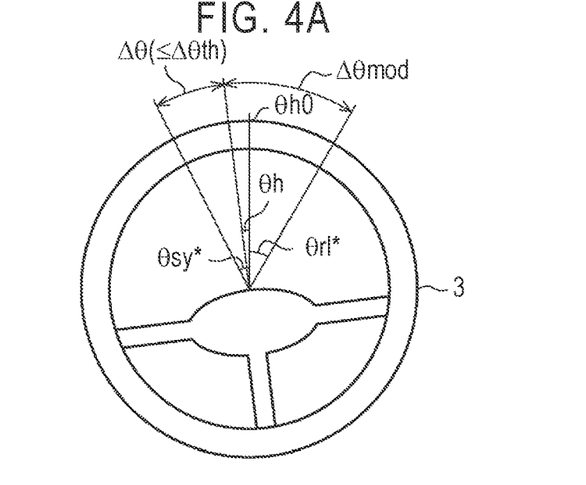
FIG. 4A is a schematic diagram illustrating an example of the synchronization operation when the angle difference between the steering angle and the target synchronization angle is small.
Figure 4B:
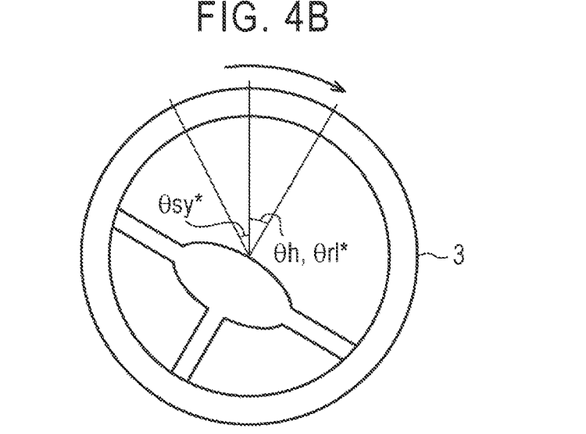
FIG. 4B is a schematic diagram illustrating the example of the synchronization operation when the angle difference between the steering angle and the target synchronization angle is small.
Figure 4C:
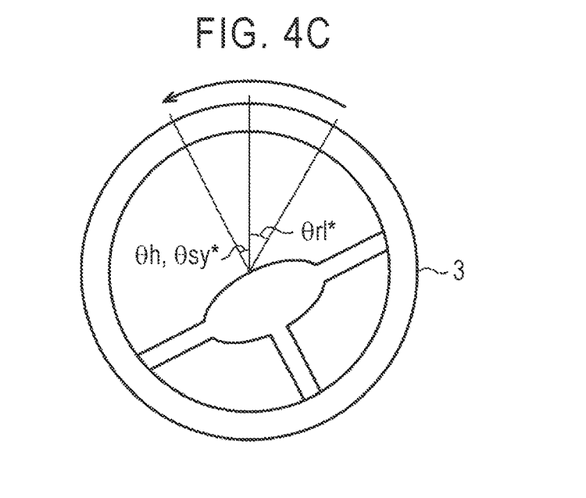
FIG. 4C is a schematic diagram illustrating the example of the synchronization operation when the angle difference between the steering angle and the target synchronization angle is small.

On the other hand, when the angle difference Δθ is equal to or less than the predetermined angle difference Δθth as illustrated in FIG. 4A, the target relay angle θrl* is located closer to the right side by the intermediate rotation amount Δθ mod than the steering angle θh is. As indicated by bold solid arrows in FIGS. 4B and 4C, the synchronization operation is performed in the same way as illustrated in FIGS. 3B and 3C. That is, the steering wheel 3 rotates to the right once and then rotates to the left.

Figure 5A:
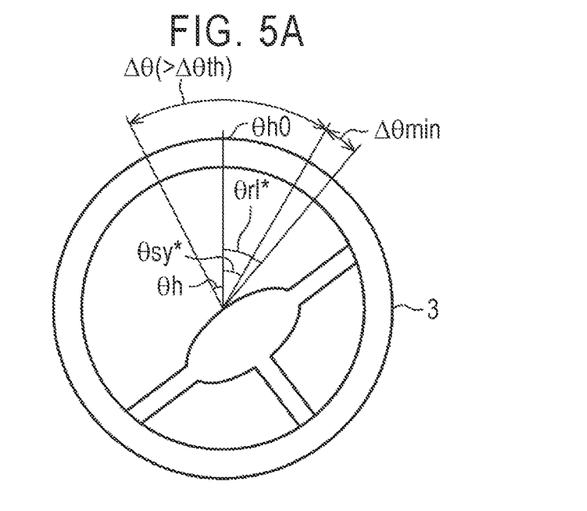
FIG. 5A is a schematic diagram illustrating another example of the synchronization operation when the angle difference between the steering angle and the target synchronization angle is large.

Subsequently, it is assumed that the target synchronization angle θsy* is located closer to the right side than the steering angle θh is. As illustrated in FIG. 5A, when the angle difference Δθ is greater than the predetermined angle difference Δθth, the target relay angle θrl* is located closer to the right side by the minimum rotation amount Δθmin than the target synchronization angle θsy* is.

Figure 5B:
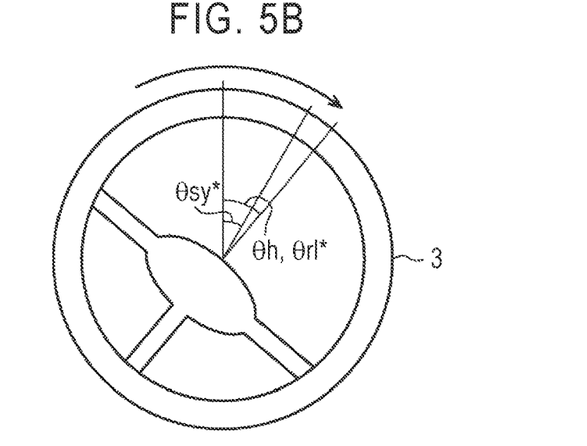
FIG. 5B is a schematic diagram illustrating the other example of the synchronization operation when the angle difference between the steering angle and the target synchronization angle is large.

When the motor driving process is started, the steering wheel 3 rotates to the right until the steering angle θh reaches the target relay angle θrl* as indicated by a bold solid arrow in FIG. 5B. Subsequently, when the steering angle θh reaches the target relay angle θrl*, the steering wheel 3 rotates to the left until the steering angle θh reaches the target synchronization angle θsy* as indicated by a bold solid arrow in FIG. 5C. That is, the steering wheel 3 rotates to the right once and then rotates to the left.

Figure 5C:
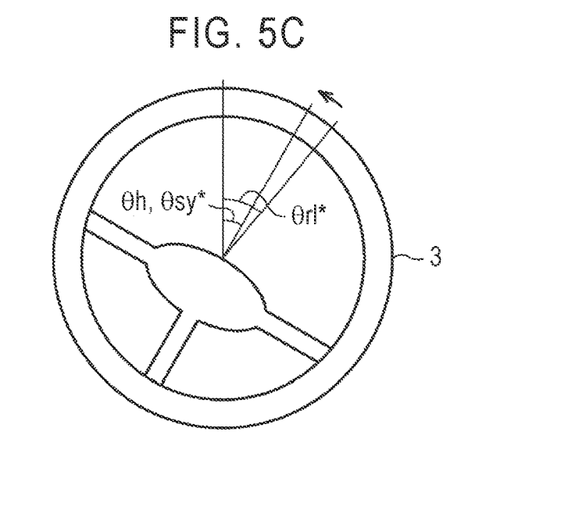
FIG. 5C is a schematic diagram illustrating the other example of the synchronization operation when the angle difference between the steering angle and the target synchronization angle is large.
Figure 6A:
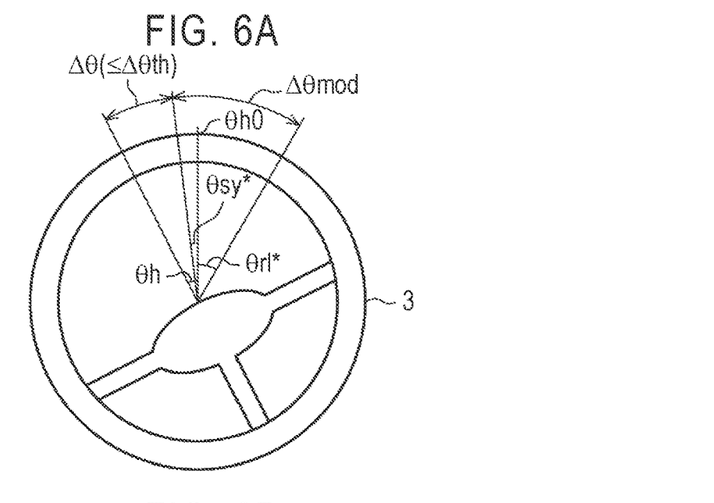
FIG. 6A is a schematic diagram illustrating another example of the synchronization operation when the angle difference between the steering angle and the target synchronization angle is small.
Figure 6B:
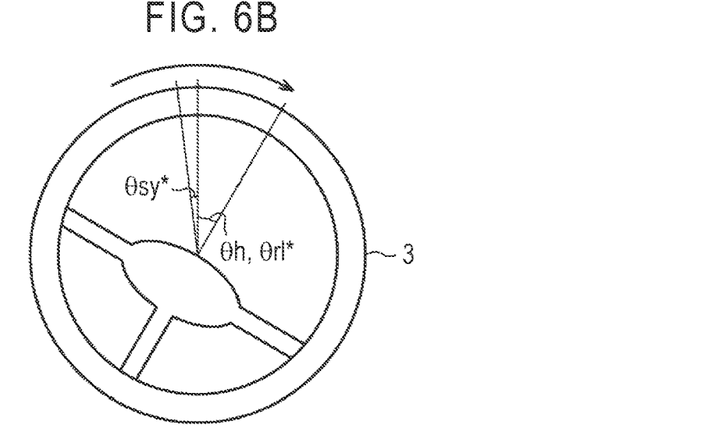
FIG. 6B is a schematic diagram illustrating the other example of the synchronization operation when the angle difference between the steering angle and the target synchronization angle is small.
Figure 6C:
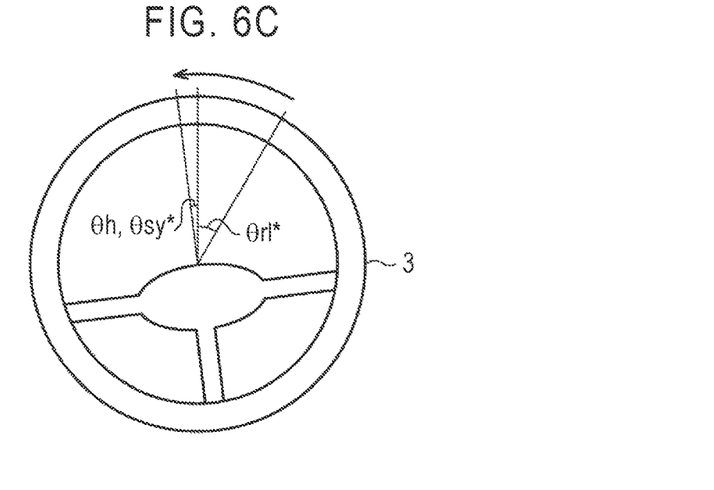
FIG. 6C is a schematic diagram illustrating the other example of the synchronization operation when the angle difference between the steering angle and the target synchronization angle is small.

On the other hand, when the angle difference Δθ is equal to or less than the predetermined angle difference Δθth as illustrated in FIG. 6A, the target relay angle θrl* is located closer to the right side by the intermediate rotation amount Δθ mod than the target synchronization angle θsy* is. As indicated by bold solid arrows in FIGS. 6B and 6C, the synchronization operation is performed in the same way as illustrated in FIGS. 5B and 5C. That is, the steering wheel 3 rotates to the right once and then rotates to the left.

Advantages of this embodiment will be described below.

(1) When synchronization control is performed by the steering control device 1, the steering wheel 3 is rotated such that the steering angle θh reaches the target synchronization angle θsy* after having reached the target relay angle θrl*, and thus the rotation direction of the steering wheel 3 is changed during the synchronization operation. That is, the synchronization operation is a two-step operation. The target relay angle θrl* is set to be located closer to the right side than one of the steering angle θh and the target synchronization angle θsy*, that is, the first-side angle θx is, regardless of the relative positional relationship therebetween. The one of the steering angle θh and the target synchronization angle θsy*, that is, the first-side angle θx is located closer to the right side (first side) than the other of the steering angle θh and the target synchronization angle θsy* is. Accordingly, regardless of the relative positional relationship between the steering angle θh and the target synchronization angle θsy*, the synchronization operation is performed such that the steering wheel 3 is rotated to the right side and then is rotated to the left side. Accordingly, since the synchronization operation is performed in the same operation manner regardless of the relative positional relationship between the steering angle θh and the target synchronization angle θsy*, it is possible to prevent a driver from feeling uneasy.

(2) When the angle difference Δθ is greater than the predetermined angle difference Δθth, the steering control device 1 calculates, as the target relay angle θrl*, an angle which is located closer to the right side by the minimum rotation amount Δθmin than the first-side angle θx is. Accordingly, the target relay angle θrl* is prevented from being excessively separated from the other (i.e., a second-side angle) of the steering angle θh and the target synchronization angle θsy*. The other (i.e., the second-side angle) of the steering angle θh and the target synchronization angle θsy* is located closer to the left side than the first-side angle θx is. Accordingly, it is possible to curb an increase in time required for the synchronization operation.

(3) When the angle difference Δθ is equal to or less than the predetermined angle difference Δθth, the steering control device 1 calculates, as the target relay angle θrl*, an angle which is located closer to the right side by the intermediate rotation amount Δθ mod than the first-side angle θx is. Accordingly, the target relay angle θrl* is prevented from being excessively close to the first-side angle θx. Accordingly, it is possible to enable a driver to easily recognize that the synchronization operation is a two-step operation.

(4) Since the intermediate rotation amount Δθ mod is set to a rotation amount which is equal to or less than a sum value of the minimum rotation amount Δθmin and the predetermined angle difference Δθth, the target relay angle θrl* is prevented from being excessively separated from the first-side angle θx. Accordingly, it is possible to curb an increase in time required for the synchronization operation.

(5) Since the steering control device 1 performs synchronization control immediately after the start switch 42 has been switched from the off state to the on state, it is possible to perform the synchronization operation at an appropriate timing. This embodiment can be modified as follows. The embodiment and the following modified examples can be combined unless technical contradiction arises.

In the aforementioned embodiment, when it is determined in Step 105 that the angle difference Δθ is zero, the target relay angle calculating process and the motor driving process are not performed, but the disclosure is not limited thereto. When the angle difference Δθ is equal to or less than a threshold value which is set to be slightly greater than zero, the target relay angle calculating process and the motor driving process may not be performed.

In the aforementioned embodiment, the synchronization control may be performed at a timing other than a timing immediately after the start switch 42 has been switched from the off state to the on state. In the embodiment, the intermediate rotation amount Δθ mod may be set to a rotation amount which is equal to or less than the minimum rotation amount Δθmin. The intermediate rotation amount Δθ mod may be set to a rotation amount which is greater than a sum value of the minimum rotation amount Δθmin and the predetermined angle difference Δθth.

In the aforementioned embodiment, as long as the target relay angle θrl* is located closer to the right side than the first-side angle θx is, the method of calculating the target relay angle θrl* can be appropriately modified. For example, when the angle difference Δθ is greater than the predetermined angle difference Δθth, an angle which is located closer to the right side by the intermediate rotation amount Δθ mod than the first-side angle θx may be calculated as the target relay angle θrl*.

In the aforementioned embodiment, a value obtained by dividing the steering angle θh by the transmission ratio varying depending on the steering angle θh and the vehicle speed V is set as the target turning-corresponding angle θp*. However, the disclosure is not limited thereto and, for example, the target turning-corresponding angle θp* may be set to the same angle as the steering angle θh. In this case, the positional relationship between the steering angle θh and the turning angle θi of the turning wheels 5 is a one-to-one relationship.

In the aforementioned embodiment, the pinion angle θpd detected by the pinion angle sensor 47 is used as the turning-side rotation angle, but the disclosure is not limited thereto. The turning-corresponding angle θpc based on the rotation angle θt of the turning-side motor 32 may be used as the turning-side rotation angle.

In the aforementioned embodiment, a steering sensor that directly detects the steering angle θh may be provided and a detection value from the steering sensor may be used as the steering-side rotation angle. In the aforementioned embodiment, the steering unit 4 may be configured such that the steering shaft 11 rotates in a range including a range exceeding 360°. In this case, the steering angle θh is calculated as an angle in a range including a range exceeding 360°.

In the aforementioned embodiment, the left side may be a first side in the circumferential direction and the right side may be a second side in the circumferential direction. In the aforementioned embodiment, the steering system 2 has a linkless structure in which a power transmission path between the steering unit 4 and the turning unit 6 is cut off. However, the disclosure is not limited thereto, and a structure in which the power transmission path between the steering unit 4 and the turning unit 6 can be cut off by a clutch may be employed by the steering system 2.

In the aforementioned embodiment, the steering control device 1 is not limited to a steering control device including a CPU and a memory and performing software processes. For example, a dedicated hardware circuit (for example, an ASIC) that performs at least some of the software processes which are performed in the aforementioned embodiments may be provided. That is, the steering control device may have at least one of the following configurations (a) to (c). (a) A processor that performs all the processes in accordance with a program and a program storage device such as a ROM that stores the program are provided. (b) A processor that performs some of the processes in accordance with a program, a program storage device, and a dedicated hardware circuit that performs the other processes are provided. (c) A dedicated hardware circuit that performs all the processes is provided. Here, the number of software processing circuits each of which includes a processor and a program storage device or the number of dedicated hardware circuits may be two or more. That is, the processes may be performed by processing circuitry including at least one of i) one or more software processing circuits and ii) one or more dedicated hardware circuits.

Technical concepts which can be understood from the embodiments and the modified examples will be described below along with advantages thereof: (A) A steering control device in which synchronization control is performed immediately after a start switch has been switched from an off state to an on state. With the above-mentioned configuration, it is possible to perform a synchronization operation at an appropriate time.

What is claimed is:

1. A steering control device configured to control a steering system with a structure in which a power transmission path between a steering unit that is connected to a steering wheel and a turning unit that turns turning wheels is cut off, the steering control device comprising
    control circuitry configured to perform synchronization control for adjusting a steering-side rotation angle that is a rotation angle convertible to a steering angle of the steering wheel, by operating a steering-side motor such that a positional relationship between the steering-side rotation angle and a turning-side rotation angle that is a rotation angle convertible to a turning angle of the turning wheels is a predetermined correspondence relationship, the steering unit including the steering-side motor configured to rotate the steering wheel,
    wherein the synchronization control includes:
        a target synchronization angle calculating process of calculating a target synchronization angle that is the steering-side rotation angle satisfying the predetermined correspondence relationship with respect to the turning-side rotation angle;
        a target relay angle calculating process of calculating a target relay angle that is located closer to a first side in a circumferential direction than a first-side angle is, the first-side angle being one of the steering-side rotation angle and the target synchronization angle and being located closer to the first side than another of the steering-side rotation angle and the target synchronization angle is; and wherein a lower limit of a rotation amount is set based on visibility of rotation of the steering wheel, and the lower limit is set as a minimum rotation amount; and when an absolute value of an angle difference between the steering-side rotation angle and the target synchronization angle is larger than a predetermined angle difference, the target relay angle calculating process calculates, as the target relay angle, an angle that is located closer to the first side by the minimum rotation amount than the first-side angle is;

a motor driving process of operating the steering-side motor such that the steering-side rotation angle reaches the target synchronization angle after operating the steering-side motor such that the steering-side rotation angle reaches the target relay angle.

2. A steering control device configured to control a steering system with a structure in which a power transmission path between a steering unit that is connected to a steering wheel and a turning unit that turns turning wheels is cut off, the steering control device comprising control circuitry configured to perform synchronization control for adjusting a steering-side rotation angle that is a rotation angle convertible to a steering angle of the steering wheel, by operating a steering-side motor such that a positional relationship between the steering-side rotation angle and a turning-side rotation angle that is a rotation angle convertible to a turning angle of the turning wheels is a predetermined correspondence relationship, the steering unit including the steering-side motor configured to rotate the steering wheel, wherein the synchronization control includes:

a target synchronization angle calculating process of calculating a target synchronization angle that is the steering-side rotation angle satisfying the predetermined correspondence relationship with respect to the turning-side rotation angle;

a target relay angle calculating process of calculating a target relay angle that is located closer to a first side in a circumferential direction than a first-side angle is, the first-side angle being one of the steering-side rotation angle and the target synchronization angle and being located closer to the first side than another of the steering-side rotation angle and the target synchronization angle is;

wherein a lower limit of a rotation amount is set based on visibility of rotation of the steering wheel, and the lower limit is set as a minimum rotation amount;

a rotation amount greater than the minimum rotation amount is set as an intermediate rotation amount; and when an absolute value of an angle difference between the steering-side rotation angle and the target synchronization angle is equal to or less than a predetermined angle difference, the target relay angle calculating process calculates, as the target relay angle, an angle that is located closer to the first side by the intermediate rotation amount than the first-side angle is;

and a motor driving process of operating the steering-side motor such that the steering-side rotation angle reaches the target synchronization angle after operating the steering-side motor such that the steering-side rotation angle reaches the target relay angle.

3. The steering control device according to claim 2, wherein the intermediate rotation amount is a rotation amount that is equal to or less than a sum value of the minimum rotation amount and the predetermined angle difference.

* * * * *